United States Patent [19]

Aine

[11] 4,277,540

[45] Jul. 7, 1981

[54] THIN FILM MAGNETIC RECORDING MEDIUM

[76] Inventor: Harry E. Aine, 1804 Stierlin Rd., Mountain View, Calif. 94040

[21] Appl. No.: 736,814

[22] Filed: Oct. 29, 1976

Related U.S. Application Data

[63] Continuation-in-part of Ser. No. 139,887, May 3, 1971, abandoned.

[51] Int. Cl.$^3$ .............................................. B32B 15/04
[52] U.S. Cl. ..................................... 428/627; 428/900; 428/433; 428/469; 428/652; 428/656; 428/678; 428/661
[58] Field of Search ................................ 427/127–132, 427/48; 428/538, 539, 900, 457

[56] References Cited

U.S. PATENT DOCUMENTS

| | | | |
|---|---|---|---|
| 3,498,837 | 3/1970 | Alstad et al. | 427/131 X |
| 3,674,544 | 7/1972 | Grosseau | 427/34 |
| 3,784,402 | 1/1974 | Reedy | 427/419 X |

FOREIGN PATENT DOCUMENTS

1145349  3/1969  United Kingdom ..................... 427/131

*Primary Examiner*—Bernard D. Pianalto
*Attorney, Agent, or Firm*—Harry E. Aine

[57] ABSTRACT

A thin film of magnetic recording material is sputter deposited over a base layer of gold and tantalum on a polished substrate. A protective layer of gold and tantalum is deposited overlaying the magnetic recording film. A solid lubricant layer such as carbon, preferably in the form of graphite, gold, silver, tin, molybdenum disulfide, and tungsten disulfide is sputter deposited or ion plated over the protective layer to reduce wear. The recording contacting portion of the recording head is similarly coated with a solid lubricant material. Other suitable protective materials include tantalum, niobium, tungsten and nitrides and carbides of such metals. In a preferred method for making such recording members, the layers are successively sputter deposited in an evacuated sputter chamber, whereby the recording layers and protective coatings are formed in a continuous process requiring only one pump down.

1 Claim, No Drawings

THIN FILM MAGNETIC RECORDING MEDIUM

RELATED CASES

The present application is a continuation-in-part application of copending parent application Ser. No. 139,887, filed May 3, 1971, now abandoned in favor of the present application.

DESCRIPTION OF THE PRIOR ART

Heretofore, thin film magnetic recording media, such as discs, drums, tapes and the like have been manufactured by plating extremely thin metallic films of magnetic recording material onto a suitable substrate member. Generally speaking, the metallic magnetic recording materials, such as iron, nickel, cobalt or nickel-cobalt alloys are deposited to a thickness between two and ten microinches. Such thin films are subject to corrosion in storage and use and, thus, corrosion resistant overcoatings have been applied to a thickness of between two and five microinches. Corrosion resistant materials for the coatings have included rhodium, $C_rO$ and SiO.

Such thin magnetic films have typically been deposited by a number of different methods, such as by electrochemical deposition, auto catalytic deposition, or vacuum deposition by evaporating the magnetic material in an evacuated chamber and condensing the evaporated material on the substrate. Various magnetic materials and methods for applying same are disclosed and discussed in an article entitled "A Critical Review of Magnetic Recording Materials" appearing in the IEEE Transactions on Magnetics, Volume MAG-5, #4, of December 1969, pages 821-839. And in an article entitled "An Analysis of High-Coercivity Thin Film Fabrication Techniques and Their Associated Properties" appearing in the November-December 1968 issue of Electrochemical Technology, pages 419-427.

Briefly, the greatest problem in utilizing thin film magnetic recording media is the susceptibility of magnetic recording media to wear. The transducer normally skims between a few microns and several microinches above the magnetic media supported by a thin film of compressed air. Periodically the transducer sinks into contact with the recording media resulting in a high speed impact of the transducer with the recording media. Collisions of this nature cause extreme wear and actual breakdown and destruction of portions of the recording media. Wear of most thin films is usually attributed to the breakdown of adhesion between the metal film and the substrate.

Protective layers deposited over the recording media must be well adhered to the media and have a greater cohesion than the metal film on which they are deposited or they will compound the problem. In addition, the overcoated protective layers are preferably conductive to prevent the build up of static electricity. The use of lubricants to minimize the problems of wear and impact has not been satisfactory. Such lubricants often tend to accumulate dust and loose magnetic material on the disc or tape. Debris collected on the transducer can cause severe damage to the magnetic material in an avalanching effect.

The protective overcoating layers should be corrosion resistive and electrically conductive to prevent build-up of static electric charge. Evaporated films exhibit by far the worse wear characteristics compared to electroless and electro plated films, probably due to their porosity and generally poor adhesion to the substrate.

Vacuum deposition is the least complex of the fabrication techniques in that it is truly a one step process. However, vacuum deposited films heretofore have had excess porosity leading to poor wear and corrosion resistance.

Others have attempted to sputter deposit thin films of magnetic recording material onto suitably polished substrates of glass and fused quartz. However, as reported in U.S. Pat. No. 3,148,079 issued Sept. 8, 1964, such prior attempts at sputter depositing magnetic films has not been successful.

SUMMARY OF THE PRESENT INVENTION

The principle object of the present invention is the provision of an improved thin film magnetic recording medium and method of making same.

In one feature of the present invention, the magnetic recording film is covered with a protective coating of gold and tantalum, whereby a protective coating is formed on the magnetic recording film.

In another feature of the present invention, a wear resistant layer of carbon is deposited as by sputtering or ion plating, preferably in the form of graphite, over the thin film of magnetic recording material to protect it from excessive wear.

In another feature of the present invention, the surface portion of the magnetic transducer which occasionally contacts the recording medium is coated with an adherent solid lubricant layer of carbon preferably in the form of graphite.

In another feature of the present invention, one or more of the layers of the recording medium such as the magnetic recording material, or one or more of its protective coatings, is deposited overlaying a polished surface of the substrate by sputter depositing the respective material over the substrate in a gaseous atmosphere at subatmospheric pressure.

Other features and advantages of the present invention will become apparent upon a perusal of the following specification.

DESCRIPTION OF THE PREFERRED EMBODIMENTS

A suitable substrate material such as mylar, in the case of recording tape, or aluminum, alumina, beryllia, or glass such as pyroceram, pyrex or the like, is lapped and polished to provide an extremely smooth surface onto which the recording medium is to be deposited. The substrate member is disposed in a chamber which is evacuated to a relatively low pressure, as of $5 \times 10^{-5}$ torr. Suitable diffusion pumps and/or getter ion pumps together with liquid nitrogen forepumps and traps are utilized for the pump down of the chamber to assure a clean vacuum and to prevent back streaming of oil from the diffusion pumps. A quartz heating element is placed within the chamber to provide a mild bakeout of the substrate during pump down. After the pressure reaches $5 \times 10^{-5}$ torr the quartz heaters are turned off and argon is leaked into the chamber through an automatic leak valve to obtain a pressure of $7 \times 10^{-3}$ torr.

The evacuated chamber contains any one of a number of different rf induced plasma sputtering electrode arrangements, such as any one or more of those disclosed in an article entitled "Advances In RF-Induced Plasma Sputtering" appearing in SCP and Solid-State Technology, December, 1967, pages 45–49 and 75. In a preferred embodiment, a plasma coil configuration of the electrodes is employed. Such configuration of electrodes includes a pair of target electrodes made of a material which is to be sputtered onto the substrate. A dc bias potential is applied to the target electrodes. Radio frequency energy is applied to a coil interposed between the target electrodes and the substrate. The dc power supply is used to establish a target potential which is negative with respect to the glow discharge.

In the glow discharge, argon ions are created and they are attracted from the plasma to bombard the target electrodes. The ion bombardment of the target electrodes causes the target material to be sputtered therefrom and to be collected or deposited upon the substrate which is to be coated. The sputtered target material arrives at the substrate with energies between 30 and 300 electron volts. By causing the target material to be driven onto the substrate, improved density of the deposited layer and improved adhesion between the deposited layer and the substrate or sublayer is obtained. Both of these characteristics, namely the improvement in density of the layer and of the improved adhesion of the layer to the substrate improves the wear resistance of the resultant recording medium.

A base layer of material (primary coat) which is compatible with the substrate is deposited up to 40 microinches in thickness, preferably in the range of 2 to 10 microinches in thickness. The base metal is selected from the group consisting of molybdenum, titanium, chromium, niobium, tantalum, vanadium and tungsten, and is preferably sputter deposited onto the polished surface of the substrate member. During deposition, relative movement between the substrate and the targets is obtained, as by combined rotation and rectilinear translation of the substrate, to assure uniform deposition of the sputtered material onto the substrate layer. The substrate is preferably first cleaned before depositing the base layer by sputter etching the surface, i.e. reversing the d.c. bias potential such that the substrate becomes the target.

The magnetic recording layer is deposited over the base layer. In a preferred embodiment, target electrodes of magnetic material are substituted for the original targets, as by flipping over the targets or by using other targets, for depositing a thin film of magnetic recording material onto the base layer. For example, a suitable magnetic material is selected from the class consisting of iron, nickel, cobalt or alloys thereof. In a preferred embodiment a nickel-cobalt alloy consisting of 30% nickel and 70% cobalt is sputter deposited onto the base layer to a thickness of between 2 and 15 microinches and preferably to a thickness of approximately 5 microinches. Relative movement between the target and the substrate is produced, as aforedescribed, to obtain uniform thickness of the deposited layer over the surface to be coated. Alternatively, the magnetic layer is deposited by the conventional electroless process.

A corrosion resistant protective layer is deposited, preferably by sputtering, over the magnetic layer to a thickness between 2 and 10 microinches and preferably approximately 5 microinches. Suitable corrosion resistant materials include gold, tantalum, niobium, platinum, chromium, tungsten and rhodium.

However, a corrosion resistant layer of gold and tantalum, preferably obtained by co-sputter deposition, is especially effective in preventing corrosion products from permeating the gold and tantalum layer into the magnetic material. The precise mechanism of how gold and tantalum serves to especially inhibit corrosion and corrosion products from diffusion through the layer to the substrate is not understood. The tantalum forms a very hard tightly adherent wear resistant and corrosion resistant layer on the magnetic layer. Gold infiltrates into the grain boundaries to inhibit permeation by corrosion products, such as hydrogen. Gold also serves as a solid lubricant on the outer surface of the gold and tantalum layer. Sputter deposited gold, as a solid lubricant, has increased adhesion to the tantalum and magnetic layers, thereby reducing the tendency for the gold to agglomerate on the surface of the recording medium.

A tantalum or tantalum and gold base layer (primary coat) is especially advantageous with use of a tantalum or tantalum and gold protective coating since such a base layer protects the magnetic layer from corrosion products diffusing from the substrate into the magnetic layer.

Alternatively, a corrosion resistant and wear resistant protective coating is obtained by reactively sputter depositing refractory nitrides or refractory carbides, such as nitrides or carbides of Si, Zr, Hf, Ti, Ta, W and Nb to a thickness of between two and ten microinches, preferably four microinches, onto the sputter etched or cleaned magnetic layer and then stabilizing the protective layer by growing an anodic oxide layer thereon to a thickness of approximately one to two microinches and annealing same at 250°–400° C. for five hours. Such carbide and nitride tantalum and niobium layers are anodized by an aqueous solution of 0.1% $H_3PO_4$. Such refractory nitrides and carbides are obtained by introducing $N_2$ or ethane or methane into the argon glow discharge used to sputter deposit the other constituents of the nitride or carbide. See Electrochemical Technology, July-August, 1968 issue, pages 269 et seq. Tungsten carbide reactively sputter deposited, as abovedescribed, also provides a wear resistant coating.

As aforementioned, gold provides a solid lubricant for reducing friction and thus wear. Other solid lubricants include silver, carbon (especially in the form of graphite), $M_oS_2$, Sn and $WS_2$. Such lubricants are preferably sputter deposited to a thickness of one to five microinches over the aforedescribed protective layer. Sputter deposition of the lubricants serves to improve the adhesion of the lubricant to the sublayer, thereby increasing the wear resistance of the protective coatings. Of the solid lubricants, gold and graphite are particularly desirable. Graphite and carbon are particularly suitable for deposition on sublayers comprised of carbide formers such as Si, Zr, Hf, Ti, Ta, Nb and W.

The magnetic transducer head portion which occasionally sinks into contact with the recording medium is preferably formed of or coated with carbon, preferably in the form of graphite, to provide a low friction wear resistant contacting surface with the recording medium.

As an alternative to sputter depositing the carbon onto the sublayer, the low friction carbon layer may be formed by ion plating according to the method disclosed in U.S. Pat. Nos. 3,329,601 or 3,386,909. The use of sputter deposition or ion plating of the carbon coating results in a tightly adherent coating of the carbon on the surface coated.

The advantage to the use of sputter deposition for depositing the successive layers of materials onto the substrate member of the recording medium is that such layers may be deposited in a one-step method where the recording medium need only be subjected to one pump down within the evacuated chamber. In addition, use of sputter deposition apparatus allows the substrate surfaces and the surfaces of subsequent layers which are to be coated to be cleaned first by bombarding the surface to be coated with ions for cleaning away contaminants that may be present on the surface to be coated. In this manner tightly adherent wear resistant and relatively non porous coatings are obtained.

What is claimed is:

1. In a thin film magnetic recording medium, a substrate member, a film of magnetic recording material overlaying said substrate, and a protective film plating of material overlaying said film of magnetic recording material, such protective film plating material forming a non-particulate continuous plated film selected from the class consisting of tantalum, niobium, tungsten, refractory carbides and refractory nitrides.

* * * * *